W. CLEMSON.

HANDLES FOR CROSS-CUT SAWS.

No. 7,433. Reissued Dec. 19, 1876.

Witnesses:

P. C. Dieterich.

Wm. Ruppenman.

Inventor:

William Clemson

Per: C. H. Watson & Co. Attorneys.

THE GRAPHIC CO. N.Y.

UNITED STATES PATENT OFFICE.

WILLIAM CLEMSON, OF MIDDLETOWN, NEW YORK, ASSIGNOR TO WHEELER, MADDEN, & CLEMSON MANUFACTURING COMPANY.

IMPROVEMENT IN HANDLES FOR CROSSCUT-SAWS.

Specification forming part of Letters Patent No. 146,749, dated January 27, 1874; reissue No. 7,433, dated December 19, 1876; application filed September 29, 1876.

*To all whom it may concern:*

Be it known that I, WILLIAM CLEMSON, of Middletown, in the county of Orange and State of New York, have invented certain new and useful Improvements in Handles for Crossut-Saws; and I do hereby declare that the following is a full, clear, and exact description thereof, that will enable others skilled in the art to which it appertains to make and use the same, reference being had to the accompanying drawings, and to the letters of reference marked thereon, which form a part of this specification.

This invention relates to handles for crosscut-saws; having for its object to furnish a handle and attachment for a saw in which the handle extends to a point below the saw attachment, furnishing a means by which the heel of the saw is set away from the handle, and one hand may be used above and the other below the attachment, as will be hereinafter more fully described.

Figure 1:
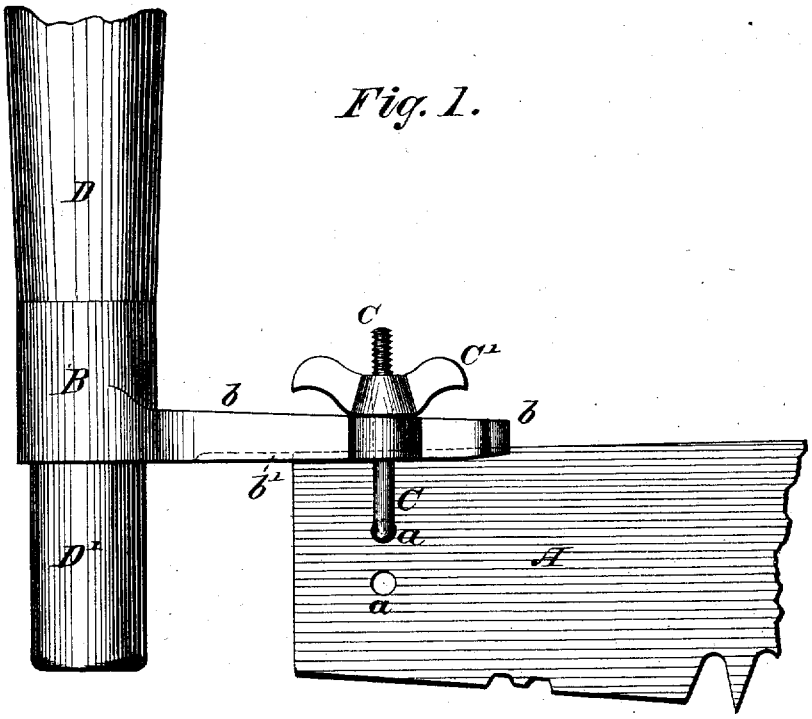
Figure 2:
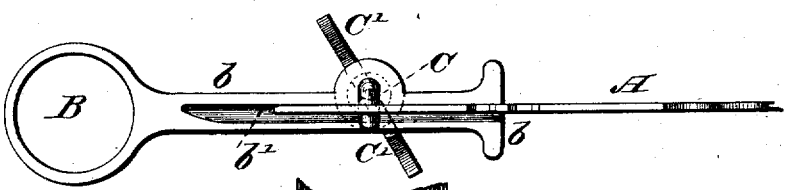
Figure 3:
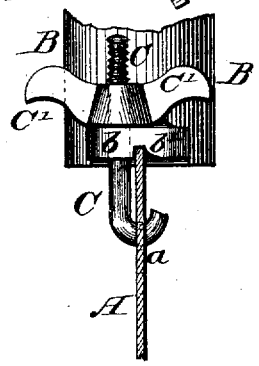

In the annexed drawings, Figure 1 is a side view of the saw-handle and connecting parts. Fig. 2 is a bottom view of the same; and Fig. 3 is a transverse view of Fig. 1.

A represents the common crosscut-saw plate as it is found on sale from the manufactory, and having the usual rivet-holes *a a* therein. B is a thimble, having the arm *b* projecting at right angles from the axis of the thimble, in which is an angular longitudinal groove, *b′*, to fit upon the back of the saw.

The arm *b* is so constructed and applied to the saw-plate as to throw the thimble B and the saw-handle away from the end of the saw-plate far enough, so that the hand has room to grasp the handle without touching the end of the saw-plate.

C is a hook screw-bolt, having the hook end *c* to hook into one of the holes *a* in the saw-blade A, and a screw-thread cut upon the upper end, that goes through the arm *b*. C′ is a thumb or other screw-nut, to screw upon the hook-bolt C, and upon or against the upper side of the arm *b*. D is a handle of wood or other proper material, turned to have a shoulder to rest upon the thimble, and a considerable distance below, or far enough to form a hand-hold.

This construction of handle and attaching parts is attached to the saw by passing the screw end of the hook-bolt C through the arm *b*, and the hook into one of the holes *a* in the saw-blade. Then turn down the thumb nut C′ hard upon the arm *b*, forcing the back of the saw into the angular groove *b′*, when the thimble and the handle passing through it are securely and firmly attached to the saw. By having the part D′ extend below the thimble, and at a distance from the end of the saw-blade it allows the operator to grasp the part D′ with one hand, while the other hand is at liberty to take hold of the handle above the thimble; or, if only one hand is used, it can grasp the part D′ in line, or nearly in line, with the cut of the saw, where the power exerted will do the greatest execution.

It is of great advantage in sawing large timber, or where the log to be sawed is high, to grasp the part D′, which, in effect, would lower the top of the log in relation to the sawyer several inches.

It will also be observed that by means of the socket B and single extended arm *b*, one hand may be used above and one below the point of attachment or connection of the saw to the handle, whereby the power may be equally applied on the line of draft of the saw by the use of both hands, which cannot be accomplished only by having a single point of attachment for the saw to the handle, with means for the use of both hands, one above and one below said point of attachment.

Having thus fully described my invention, what I claim as new, and desire to secure by Letters Patent, is—

1. The thimble or socket B, having projecting single arm *b*, provided with devices to hold the saw-blade, in combination with the handle D D′, one of the parts extending above the thimble or socket, and the other part below the same, without any lower support, as and for the purpose set forth.

2. A crosscut-saw handle, D, having single extension D′, securing the saw A to the handle, and, a screw-clamping device, C, the part D′ of the handle extending through and below the part B, whereby the saw is secured to the handle at a point above the lower portion of the handle, substantially as and for the purpose set forth.

In testimony that I claim the foregoing I have hereunto set my hand this 27th day of September, 1876.

WM. CLEMSON.

Witnesses:
CHAS. I. HUMPHREY,
WM. MILLSPAUGH.